United States Patent
Nagar et al.

(10) Patent No.: US 12,050,506 B2
(45) Date of Patent: Jul. 30, 2024

(54) GENERATING INCIDENT EXPLANATIONS USING SPATIO-TEMPORAL LOG CLUSTERING

(71) Applicant: International Business Machines Corporation, Armonk, NY (US)

(72) Inventors: Seema Nagar, Bangalore (IN); Mudhakar Srivatsa, White Plains, NY (US); Amitkumar Manoharrao Paradkar, Mohegan Lake, NY (US); Pooja Aggarwal, Bengaluru (IN); Joshua M Rosenkranz, White Plains, NY (US); Rohan R Arora, Champaign, IL (US); Dipanwita Guhathakurta, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/964,564

(22) Filed: Oct. 12, 2022

(65) Prior Publication Data
US 2024/0126630 A1   Apr. 18, 2024

(51) Int. Cl.
G06F 11/07   (2006.01)

(52) U.S. Cl.
CPC ...... *G06F 11/0769* (2013.01); *G06F 11/0721* (2013.01)

(58) Field of Classification Search
CPC .................. G06F 11/0769; G06F 11/0721
See application file for complete search history.

(56) References Cited

U.S. PATENT DOCUMENTS

| | | | |
|---|---|---|---|
| 9,317,829 | B2 | 4/2016 | Anand et al. |
| 9,459,950 | B2 | 10/2016 | Bhamidipaty et al. |
| 10,037,239 | B2 | 7/2018 | Mohandoss |
| 10,103,960 | B2 | 10/2018 | Boubez |
| 10,193,741 | B2 | 1/2019 | Zafer et al. |
| 10,454,753 | B2 | 10/2019 | Sasturkar et al. |
| 10,459,951 | B2 | 10/2019 | Venkataraman et al. |
| 10,805,151 | B2 | 10/2020 | Liu et al. |

(Continued)

FOREIGN PATENT DOCUMENTS

CN      105320585 B      4/2019

OTHER PUBLICATIONS

Barford et al., Network performance anomaly detection and localization, IEEE INFOCOM 2009, pp. 1377-1385, Apr. 19-25, 2009.

(Continued)

*Primary Examiner* — Nadeem Iqbal
(74) *Attorney, Agent, or Firm* — Garg Law Firm, PLLC; Rakesh Garg; Nicholas Welling

(57) ABSTRACT

An embodiment includes detecting a set of anomalies recorded during a first predefined window of time in log entries for a computer environment. The embodiment also includes generating cluster data representative of a cluster of anomalies from among the set of anomalies, where the cluster is formed using a lattice clustering algorithm that spatially distinguishes the cluster of anomalies from other anomalies in the set of anomalies. The embodiment also includes composing an explanation using log templates generated from log entries associated with the cluster of anomalies.

17 Claims, 9 Drawing Sheets

(56) References Cited

U.S. PATENT DOCUMENTS 10,810,074 B2 * 10/2020 Yu .................. G06F 11/0766
10,855,548 B2 * 12/2020 Garvey ............... H04L 41/142
11,296,964 B2    4/2022 Kumar et al.
11,356,320 B2    6/2022 Côté et al.

OTHER PUBLICATIONS

Lee et al., Precision and Recall for Range-Based Anomaly Detection, SysML'18, Feb. 11, 2018.

* cited by examiner

GENERATING INCIDENT EXPLANATIONS USING SPATIO-TEMPORAL LOG CLUSTERING

BACKGROUND

The present invention relates generally to a method, system, and computer program product for management of computer systems. More particularly, the present invention relates to a method, system, and computer program for generating incident explanations using spatio-temporal log clustering.

In recent years, the cloud computing platform has emerged as the most popular way of providing a wide range of computational resources, such as infrastructure, platform, and application services. In this regard, various vendors offer cloud-based solutions to optimize the use of their data centers. Modern cloud-based applications are distributed, heterogeneous, and can scale rapidly to respond to demand. This flexibility is facilitated by the use of a fine-grained service-oriented architecture, sometimes referred to as a microservice architecture.

A microservice is a web service that offers a single purpose and exposes a set of APIs to other microservices, which collectively implement a given application. Such applications can be built as a collection of different microservices, instead of a monolithic app. Each microservice of a microservice-based application can run on its own and may be created using different coding or programming languages. Further, each microservice can be developed, deployed, and managed independent of other constituent microservices of the microservice-based application. New features and updates to a microservice can be continuously delivered in a rapid, incremental fashion, wherein newer versions of microservices can be continually integrated into a production deployment. Microservice-based applications developed in this manner are dynamic as they can be updated and deployed frequently.

SUMMARY

The illustrative embodiments provide for generating incident explanations using spatio-temporal log clustering. An embodiment includes detecting a set of anomalies recorded during a first predefined window of time in log entries for a computer environment. The embodiment also includes generating cluster data representative of a cluster of anomalies from among the set of anomalies, where the cluster is formed using a lattice clustering algorithm that spatially distinguishes the cluster of anomalies from other anomalies in the set of anomalies. The embodiment also includes composing an explanation using log templates generated from log entries associated with the cluster of anomalies. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
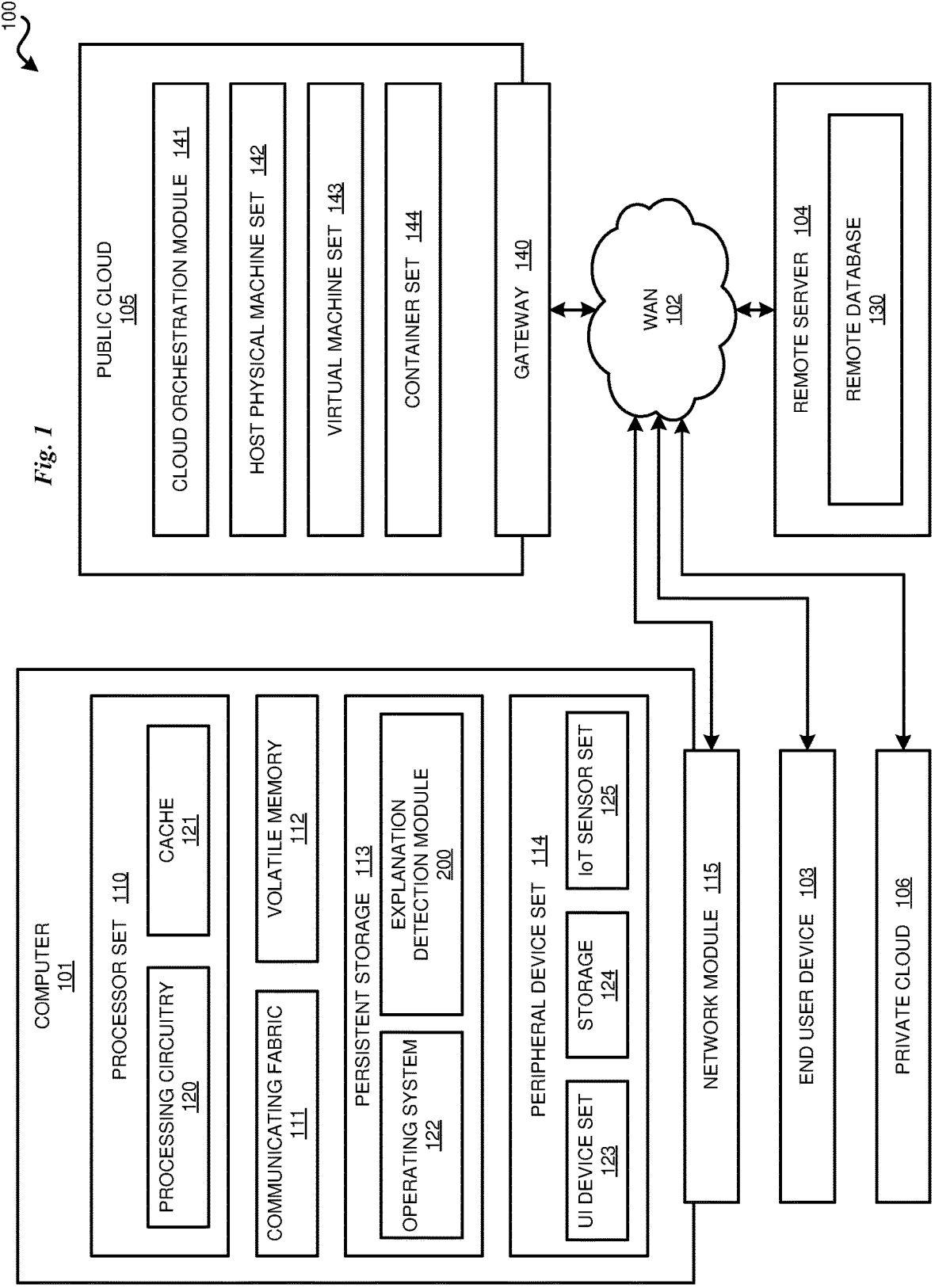
FIG. 1 depicts a block diagram of a computing environment in accordance with an illustrative embodiment.

A key challenge with cloud applications is that they are difficult to debug. Earlier techniques relied on simple approaches such as monitoring CPU usage, JVM memory consumption, and stack traces, which were sufficient in monolithic application monitoring. As applications have become more distributed and the need for continuous availability with limited resources has become a reality, the debugging of these distributed applications in the microservices world has become ever more challenging.

Outages in distributed applications can result in a huge loss for an organization, such as lost revenue, customer dissatisfaction, and opportunity loss, among many others. Finding the explanation of what triggered an incident/outage is not easy because the cloud native applications have multiple components spread across a distributed infrastructure.

Illustrative embodiments address these challenges using an approach that combines a topology aspect and a temporal aspect applied to data from logs to find an explanation of an incident reported by an anomaly detection process. An anomaly detection process may include detecting an anomaly or anomalous event based on an evaluation of log files and/or other data generated by various components of a computing environment. In some embodiments, detected anomalies include system outages, such as a hardware or software failures. In some embodiments, detected anomalies include various other types of incidents, such as performance-related anomalies that may be indicative of impending outages, and/or security-related anomalies for automated threat detection purposes.

In an illustrative embodiment, an anomaly detection system compares log file data and/or other data generated by various components of a computing environment to normal patterns and reports any significant deviation as an anomaly or anomalous event. Disclosed embodiments analyze spatial and temporal aspects of the anomaly to automatically and autonomously generate an explanation for the anomaly. In some embodiments, an anomaly detection process generates anomalous incident explanations using spatio-temporal log clustering to isolate log entries related to the anomalous incident. In some embodiments, the spatio-temporal clustering uses spatial information from services deployment topology and temporal information from streaming logs emitted by the services. In some embodiments, the anomaly detection process then extracts and aggregates log templates from the isolated log entries.

In an illustrative embodiment, an anomaly detection process detects a set of anomalies recorded during a predefined window of time. In some embodiments, the detected set of anomalies is detected to be a significant set of anomalies by calculating a moving average and a moving standard deviation from binary count data that is indicative of total numbers of anomalies for the predefined window of time. In some embodiments, the predefined window of time is one of a plurality of predefined consecutive windows of time.

In some embodiments, the process generates the binary count data from binary data labels for each of one or more monitoring data log entries, where the binary data labels are indicative of the log entry being anomalous or non-anomalous (e.g., "1" indicates anomalous; "0" indicates non-anomalous, or vice-versa). In some embodiments, the process maintains counts of anomalies as indicated by the values of the binary data labels and uses a z-score algorithm to process the anomaly count data in order to detect anomalies of particular significance having a count value that exceeds a threshold number of standard deviations. In some such embodiments, the process uses count values in a moving window of time or number of input data labels to calculate a moving mean and a moving standard deviation.

In some embodiments, the process establishes the moving window based on a configurable lag value. In some embodiments, the process uses a configurable influence value (e.g., between 0 and 1) that establishes the impact of new incoming data label values on the mean and standard deviation. For example, a lag of 5 will use the last 5 observations to smooth the data; a threshold of 3.5 will be indicative of a significant anomaly if a count is 3.5 standard deviations away from the moving mean; and an influence of 0.5 gives new data half of the influence that normal data-points have.

In some embodiments, the process detects dense anomaly regions by iterating over the significant anomalies in a sliding window fashion and marking windows with total significant anomalies spanning more than a WINDOW_DENSITY parameter (not necessarily contiguous) as dense regions. In some such embodiments, the process allows momentary significant anomalies to be filtered out, allowing the process to focus primarily on anomalies that are significant in number and persist over some threshold period of time as established by the WINDOW_DENSITY parameter.

In some embodiments, the process detects persistent anomaly regions by identifying peak widths in the dense anomaly plot along with their start and finish times. If the peak width >WIDTH_THRESHOLD (i.e., the anomaly persists for more than a WIDTH_THRESHOLD parameter), the process marks the anomaly as persistent. If there are several smaller width anomalies close by, the process merges them together and, if the combined width is more than the threshold, then the process labels it as persistent.

In an illustrative embodiment, an anomaly detection process generates cluster data representative of a cluster of anomalies from among the set of anomalies using a lattice clustering algorithm. In some embodiments, the process uses a lattice clustering algorithm that spatially distinguishes the cluster of anomalies based on composite key data associated with the set of anomalies. In some embodiments, the process forms a partially ordered set of data values for an anomaly in the cluster of anomalies using associated composite key data. In some embodiments, the data in the first partially ordered set of data values includes a network address, a subnet address, a domain name, a subdomain name, an Internet protocol address, and/or a geohash. In some embodiments, the process encodes the associated composite key data at a first lattice node using an identify function. In some such embodiments, the process re-encodes the associated composite key data at a second lattice node that is higher than the first lattice node by generalizing at least one of the ordered set of data values. In some embodiments, the process identifies the second lattice node as an optimal encoding level for the first anomaly based at least in part on an entropy value and a count value at the second lattice node.

In an illustrative embodiment, an anomaly detection process composes an explanation using log templates generated from log entries associated with the cluster of anomalies. In some embodiments, the process uses a regular expression based log template extraction technique. In alternative embodiments, the process uses a machine learning based log template extraction technique. In some embodiments, the process aggregates the extracted log templates to generate the explanation.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved explanation detection module 200 that combines a topology aspect and a temporal aspect applied to data from logs to find an explanation of anomalous events in a computing environment. In addition to explanation detection module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and explanation detection module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in explanation detection module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in explanation detection module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
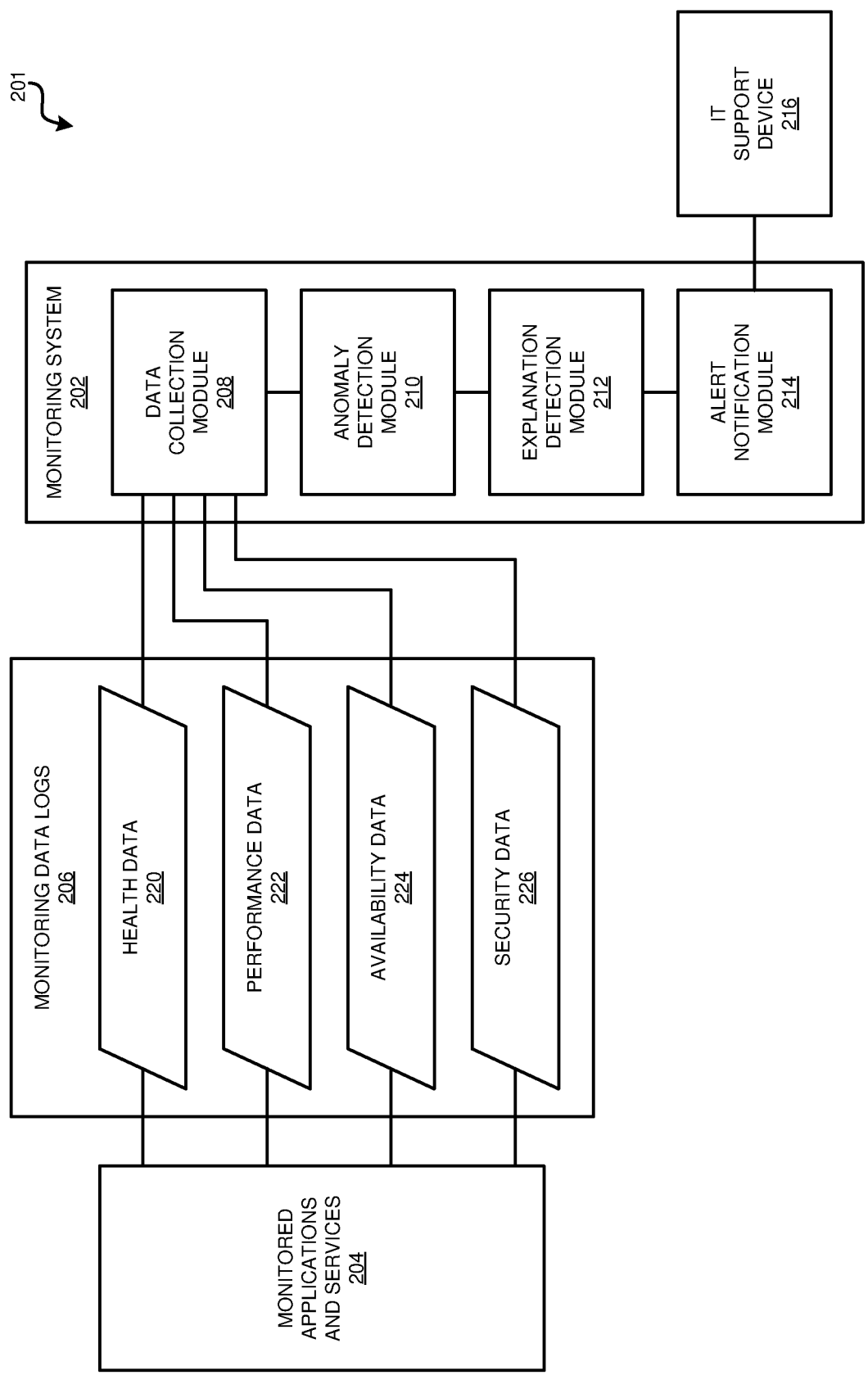
FIG. 2 depicts a block diagram of a system monitoring environment in accordance with an illustrative embodiment.

With reference to FIG. 2, this figure depicts a block diagram of a system monitoring environment 201 in accordance with an illustrative embodiment. In the illustrated embodiment, the system monitoring environment 201 includes a monitoring system 202. In some embodiments, the monitoring system 202 is an example of the computer 101 of FIG. 1.

In the illustrated embodiment, the monitoring system 202 includes a data collection module 208, an anomaly detection module 210, an explanation detection module 212, and an alert notification module 214. In alternative embodiments, the system monitoring environment 201 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the monitoring system 202 monitors various forms of monitoring data in monitoring data logs 206. The monitoring data provides information indicative of the health and performance of various monitored applications and services 204, for example which may be operating in a cloud environment. If the monitoring system 202 detects anomalies in the monitoring data logs 202, the monitoring system 202 alerts IT support via IT support devices 216, where the devices 216 may include such things as smartphones, laptop computers, or other computing device.

In the illustrated embodiment, the monitoring data logs 206 include time-series data from multiple sources: health data 220, performance data 222, availability data 224, and security data 226. The monitoring system 202 includes a data collection module 208 that receives the time-series monitoring data from each of the data sources in the form of raw metric values. In some embodiments, the data collection module 208 organizes the various time-series by grouping the raw metric values by metric type and by origin. As a more specific example, in some embodiments, the monitored applications and services 204 comprises a plurality of microservices, and the data collection module 208 groups the time-series raw metric values by metric type and microservice of origin.

In the illustrated embodiment, the data collection module 208 provides the organized time-series monitoring data to the anomaly detection module 210. The anomaly detection module 210 may use any known technique for detecting anomalies in the monitoring data. For example, in some embodiments, the anomaly detection module 210 processes the times-series data using threshold comparisons to determine whether each data value is within a preset acceptable range for its respective data source. In such embodiments, a data value is considered anomalous if it is outside of a preset acceptable range. In some embodiments, the anomaly detection module 210 generates binary data labels for each of the monitoring data log entries, where the binary data labels are indicative of the log entry being anomalous or non-anomalous (e.g., "1" indicates anomalous; "0" indicates non-anomalous, or vice-versa).

In the illustrated embodiment, the anomaly detection module 210 then provides the labeled time-series data to the explanation detection module 212. In some embodiments, the explanation detection module 212 is an example of the explanation detection module 200 of FIG. 1. The explanation detection module 212 processes the labeled time-series data using spatio-temporal clustering techniques described herein to generate explanations for detected anomalies. In some embodiments, the spatio-temporal clustering uses spatial information from services deployment topology and uses temporal information from the time-series monitoring data. In some such embodiments, the explanation detection module 212 uses log entries from the resulting clusters to form a composing string that provides an explanation for the anomaly cluster.

In the illustrated embodiment, when an anomaly is detected in the monitoring data, the alert notification module 214 issues an alert to IT support via IT support devices 216. In some embodiments, the alert includes an explanation generated by the explanation detection module 212, which provides IT support with a better understanding of the underlying reason for the anomaly, which in turn allows for faster response times and repairs and thereby reduces downtime of the affected systems.

Figure 3:
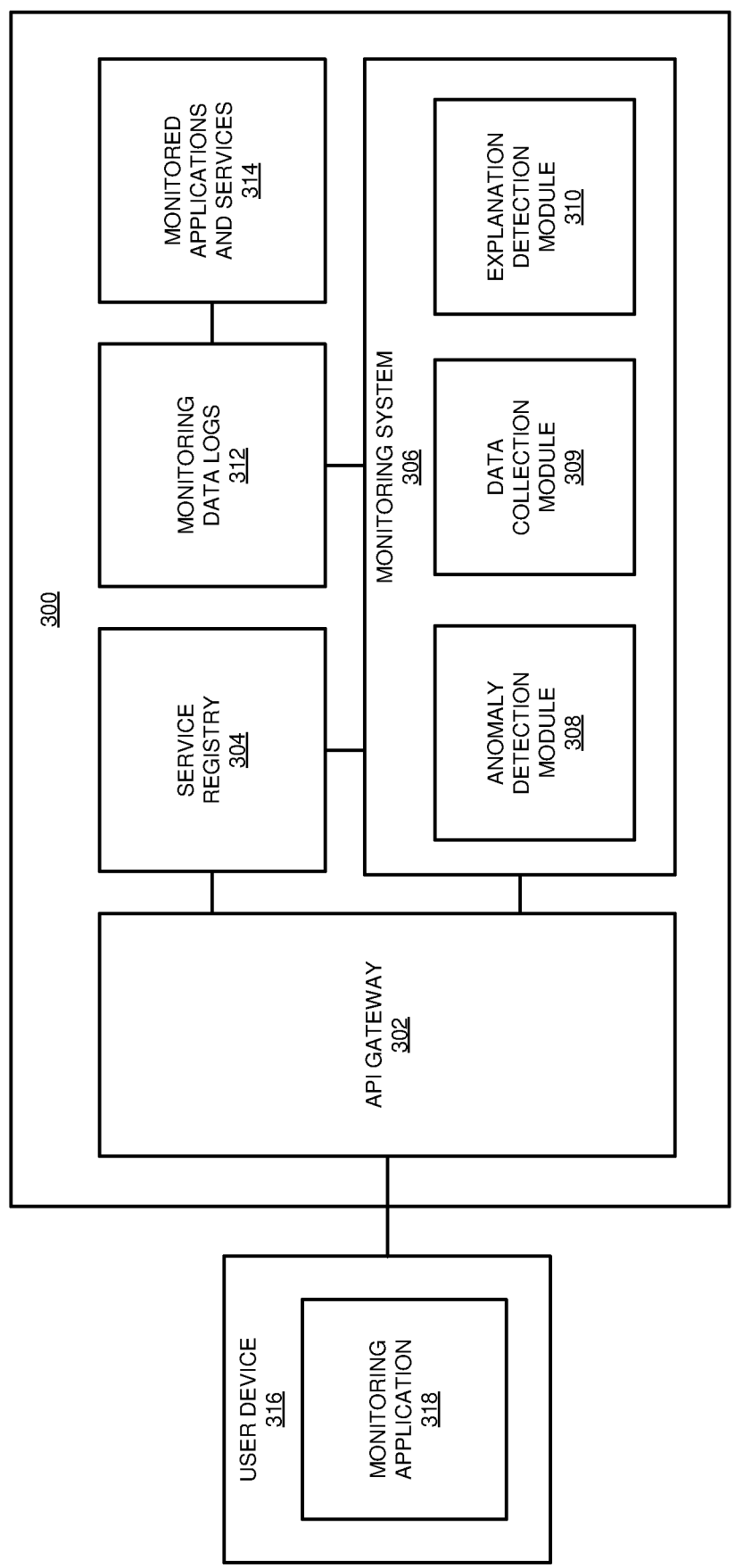
FIG. 3 depicts a block diagram of an example service infrastructure that includes a monitoring system in accordance with an illustrative embodiment.

With reference to FIG. 3, this figure depicts a block diagram of an example service infrastructure 300 that includes a monitoring system 306 in accordance with an illustrative embodiment. In some embodiments, the monitoring system monitoring system 306 is an example of the computer 101 of FIG. 1 and the explanation detection module 310 is an example of the explanation detection module 200 of FIG. 1. In some embodiments, the anomaly detection module 308 is an example of the anomaly detection module 210 of FIG. 2, the data collection module 309 is an example of the data collection module 208 of FIG. 2, and the explanation detection module 310 is an example of the explanation detection module 212 of FIG. 2.

In the illustrated embodiment, the service infrastructure 300 provides services and service instances to a user device 316. User device 316 communicates with service infrastructure 300 via an API gateway 302. In various embodiments, service infrastructure 300 and its associated monitoring system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 316 connects with API gateway 302 via any suitable network or combination of networks such as the Internet, etc. and uses any suitable communication protocols such as Wi-Fi, Bluetooth, etc. Service infrastructure 300 may be built on the basis of cloud computing. API gateway 302 provides access to client applications like monitoring system 306. API gateway 302 receives service requests issued by client applications and creates service lookup requests based on service requests. As a non-limiting example, in an embodiment, the user device 316 is a smartphone, a laptop, or other computing device that runs a monitoring application 318. In some embodiments, the monitoring application 318 accesses the monitoring system 306 via API gateway 302.

In the illustrated embodiment, service infrastructure 300 includes a service registry 304. In some embodiments, service registry 304 looks up service instances of monitoring system 306 in response to a service lookup request such as one from API gateway 302 in response to a service request from the monitoring application 318 of the user device 316. For example, in some embodiments, the service registry 304 looks up service instances of monitoring system 306 in response to requests from the monitoring application 318 related to anomaly detection by the anomaly detection module 308, for data collected by the data collection module 309, or for an anomaly explanation generated by the explanation detection module 310. In some embodiments, the monitoring system 306 monitors various monitored applications and/or services 314 by receiving and analyzing monitoring data logs 312 that are output from the applications and/or services 314 or by sensors that monitor the applications and/or services.

In some embodiments, the service infrastructure 300 includes one or more instances of the monitoring system 306. In some such embodiments, each of the multiple instances of the monitoring system 306 run independently on multiple computing systems. In some such embodiments, monitoring system 306, as well as other service instances of monitoring system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics and selects top-ranking service instances for classification requests. In some such embodiments, in the event that a service instance becomes unresponsive or, unhealthy, the service registry will no longer provide its address or information about this service instance to other services.

Figure 4:
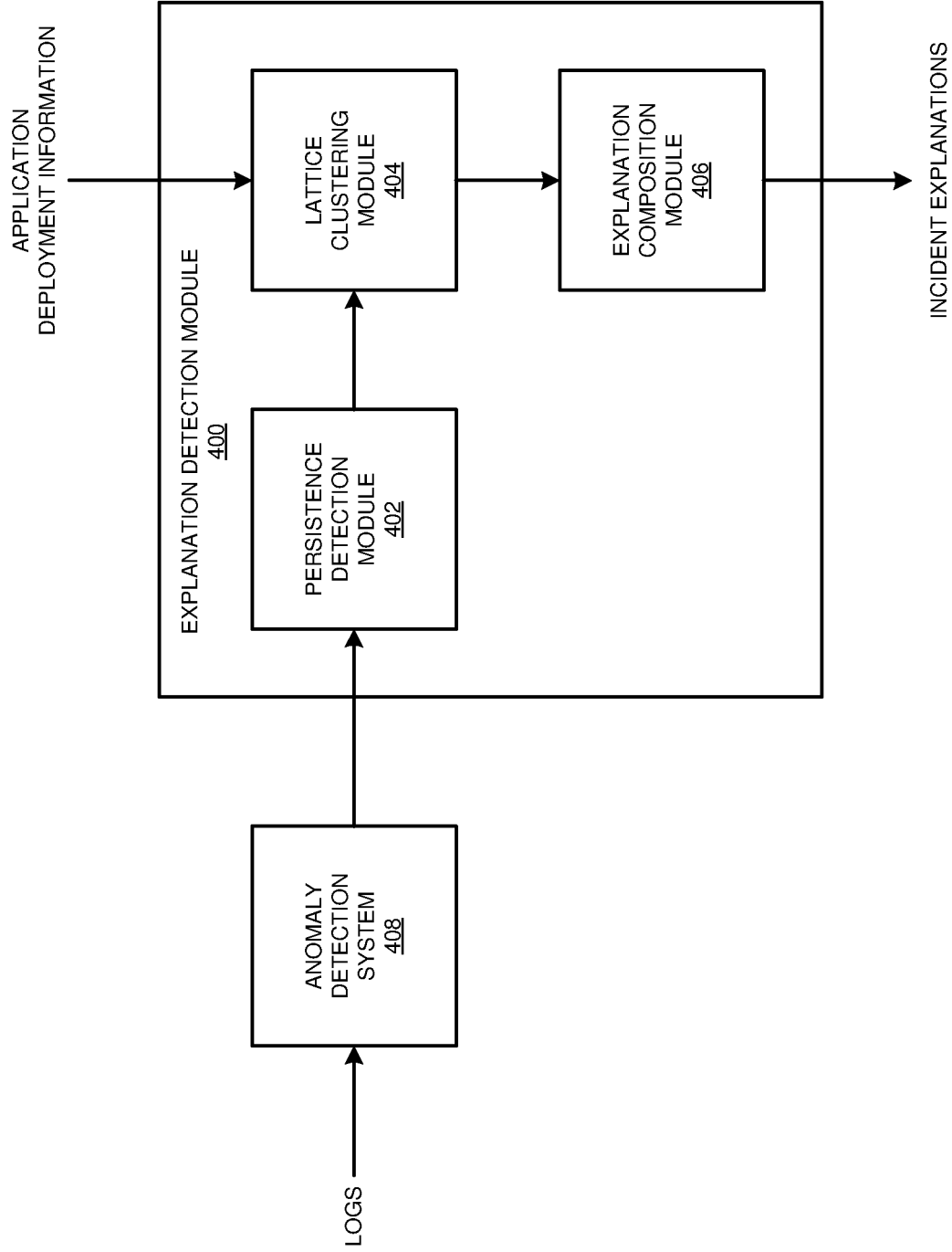
FIG. 4 depicts a block diagram of an example explanation detection system in accordance with an illustrative embodiment.

With reference to FIG. 4, this figure depicts a block diagram of an example explanation detection system 400 in accordance with an illustrative embodiment. In a particular embodiment, the explanation detection system 400 is an example of explanation detection module 200 of FIG. 1, explanation detection module 212 of FIG. 2, or explanation detection module 310 of FIG. 3.

In the illustrated embodiment, the explanation detection system 400 includes a persistence detection module 402, a lattice clustering module 404, and an explanation composition module 406. In alternative embodiments, the explanation detection system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the persistence detection module 402 detects persistent temporal intervals in the streaming logs received from anomaly detection system 408, where error behavior is significant, for a certain duration. The lattice clustering module 404 performs lattice clustering on the error logs by using the information present for topology, for example, system hierarchy. This will yield regions in the logs where there are groups of errors that are "indistinguishable" from each other. The explanation composition module 406 finds an explanation for each cluster by extracting and aggregating log templates from log entries of the clustered error logs.

Figure 5:
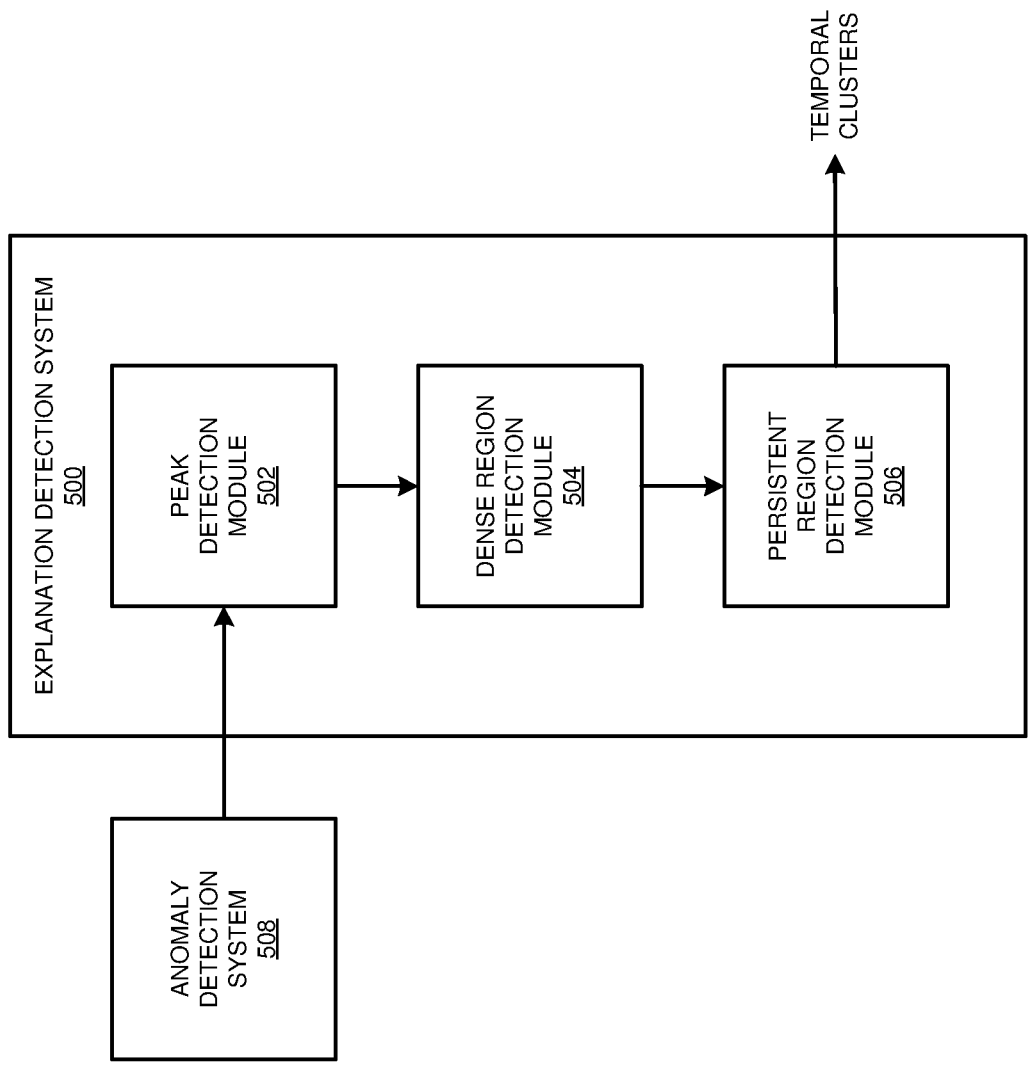
FIG. 5 depicts a block diagram of an example persistence detection module in accordance with an illustrative embodiment.

With reference to FIG. 5, this figure depicts a block diagram of an example persistence detection module 500 in accordance with an illustrative embodiment. In a particular embodiment, the persistence detection module 500 is an example of persistence detection module 402 of FIG. 4.

In the illustrated embodiment, the persistence detection module 500 includes a peak detection module 502, a dense region detection module 504, and a persistent region detection module 506. In alternative embodiments, the persistence detection module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the anomaly detection system 508 is an example of the anomaly detection module 210 of FIG. 2. In some embodiments, the anomaly detection system 508 generates binary data labels for each of one or more monitoring data log entries, where the binary data labels are indicative of the log entry being anomalous or non-anomalous (e.g., "1" indicates anomalous; "0" indicates non-anomalous, or vice-versa). The peak detection module 502 receives the binary data labels and maintains counts of anomalies as indicated by the values of the binary data labels. In some embodiments, the peak detection module 502 uses a z-score algorithm to process the anomaly count data in order to detect anomalies of particular significance having a count value that exceeds a threshold number of standard deviations, where the threshold number is a configurable value. In some such embodiments, the peak detection module 502 uses count values in a moving window of time or number of input data labels to calculate a moving mean and a moving standard deviation. The z-score algorithm establishes the moving window based on a configurable lag value. The z-score algorithm also uses a configurable influence value (e.g., between 0 and 1) that establishes the impact of new incoming data label values on the mean and standard deviation. For example, a lag of 5 will use the last 5 observations to smooth the data; a threshold of 3.5 will be indicative of a significant anomaly if a count is 3.5 standard deviations away from the moving mean; and an influence of 0.5 gives new data half of the influence that normal data-points have. Thus, the peak detection module 502 detects significant anomalies by constructing a moving average A and moving standard deviation σ of the anomaly counts using the parameters (lag, threshold, influence) to capture system behavior before the first major peak. With T as a threshold, the peak detection module 502 marks points Ai as significant peaks if:

$$A_i > \bar{A} + T\sigma$$

In the illustrated embodiment, the dense region detection module 504 detects dense anomaly regions. In some embodiments, the dense region detection module 504 accomplishes this by iterating over the significant anomalies in a sliding window fashion and marking windows with total significant anomalies spanning more than a WINDOW_DENSITY parameter (not necessarily contiguous) as dense regions. The WINDOW_DENSITY parameter is a configurable value. The dense region detection module 504 allows momentary significant anomalies to be filtered out, allowing the explanation detection module to focus primarily on anomalies that are significant in number and persist over some threshold period of time as established by the WINDOW_DENSITY parameter.

In the illustrated embodiment, the persistent region detection module 506 detects persistent anomaly regions by identifying peak widths in the dense anomaly plot along with their start and finish times. If the peak width >WIDTH_THRESHOLD (i.e., the anomaly persists for more than a WIDTH_THRESHOLD parameter), the persistent region detection module 506 marks the anomaly as persistent. If there are several smaller width anomalies close by, the persistent region detection module 506 merges them together and, if the combined width is more than the threshold, then the persistent region detection module 506 labels it as persistent.

Figure 6:
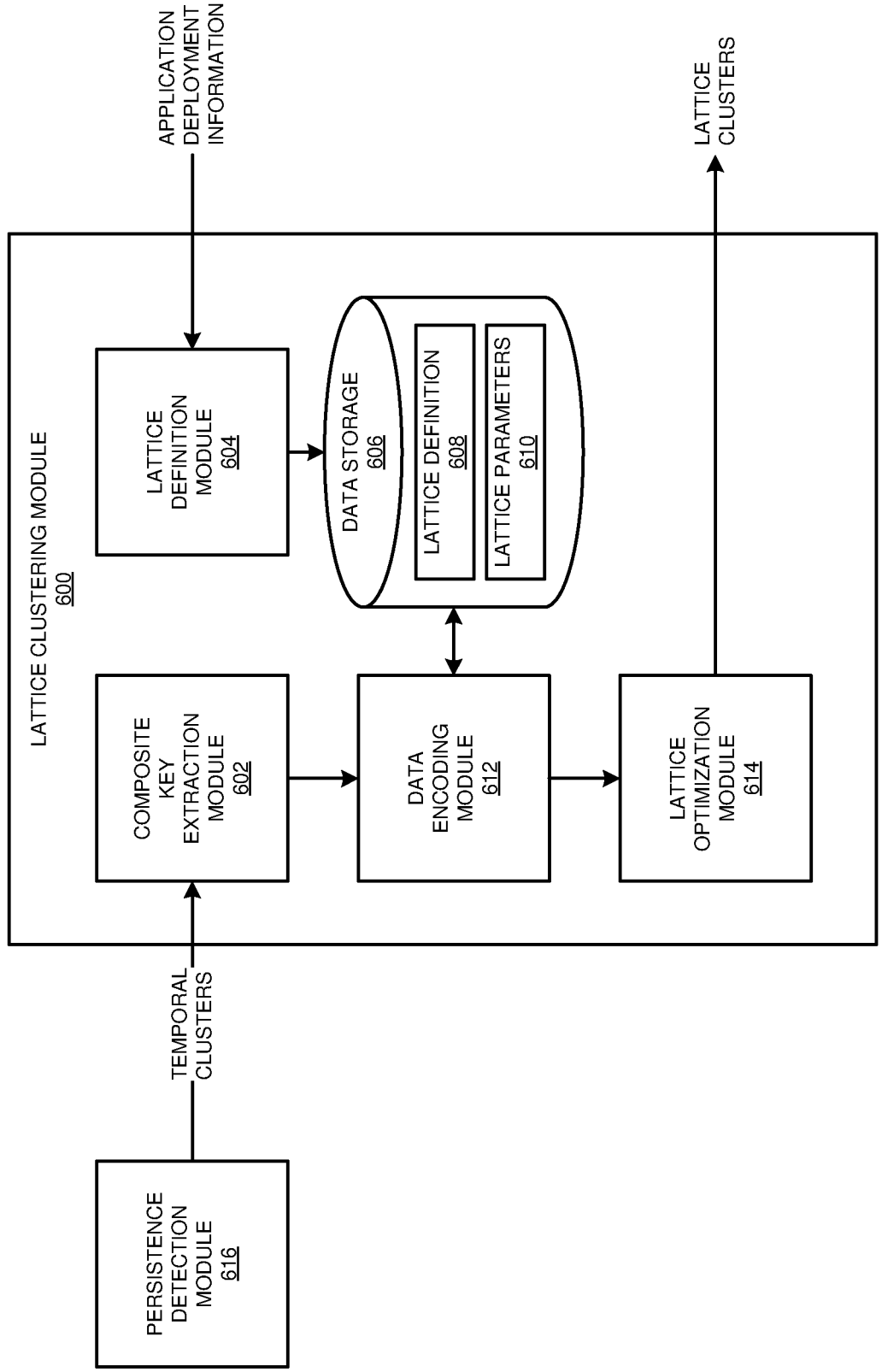
FIG. 6 depicts a block diagram of an example lattice clustering module in accordance with an illustrative embodiment.

With reference to FIG. 6, this figure depicts a block diagram of an example lattice clustering module 600 in accordance with an illustrative embodiment. In a particular embodiment, the lattice clustering module 600 is an example of lattice clustering module 404 of FIG. 4.

In some embodiments, the lattice clustering module 600 includes a composite key extraction module 602, a lattice definition module 604, a data storage 606, a data encoding module 612, and a lattice optimization module 614. In alternative embodiments, the lattice clustering module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the lattice definition module 604 receives application deployment information that will be used to construct a lattice model for lattice clustering. As a non-limiting example, an explanation detection module that includes the lattice definition module 604 may be used for providing explanations for anomalies that occur in a microservices application deployed on a container-based platform in a cloud infrastructure, such as microservices deployed on a Kubernetes platform (Kubernetes is a registered trademark of Google Inc.). In this example, the application is deployed in a namespace in a cluster that has nodes, where each node has pods, and the pods have containers, with each container being identified by a container identifier (container ID). This deployment information is provided to the lattice definition module 604, which uses the deployment information to define a hierarchical deployment model (namespace->cluster->node->pod->container->container ID). The lattice definition module 604 then uses the hierarchical deployment model as a lattice definition 608 that is stored in the data storage 606. The data storage 606 is a computer readable storage medium that stores the lattice definition 608, along with lattice parameters 610 for controlling various aspects of the lattice clustering algorithm.

In the illustrated embodiment, the composite key extraction module 602 receives the temporal clusters generated by a persistence detection module 616, which in some embodiments is an example of the persistence detection module 500 of FIG. 5. In some embodiments, the temporal clusters of anomalies are associated with respective log entries. In some such embodiments, the log data is associated with a composite key that is extracted by the composite key extraction module 602. For example, a typical domain name system (DNS) log includes information such as shown in Table 1:

TABLE 1

| Host/Subnet | Domain Name | Request Code | Response Code | Geohash | Volume | Timestamp |
|---|---|---|---|---|---|---|
| 10.0.0.1 | akamai.net | 1 | 1 | 3r0dz | 10 | 1574692341411 |
| 10.0.1.1 | google.com | 1 | 20 | 4e3dw | 100 | 1574692341820 |
| 10.0.1.2 | google.com | 1 | 1 | 3r0dz | 20 | 1574692342320 |

In the example shown in Table 1, the composite key includes the following keys: Host/Subnet, Domain Name, Request Code, Response Code, and Geohash. For each instance of the key there is one time series defined by Volume and Timestamp.

In some embodiments, the lattice clustering involves auto-grouping, which is an unsupervised clustering technique that provides a core primitive for creating groups based on the composite key. However, unlike many standard clustering algorithms, the fields in the composite key do not belong to a metric space. Nonetheless, the fields can be hierarchically rolled up. For example, on the host/subnet field: 10.0.0.1 broadens to 10.0.0.*, which broadens to 10.0.*, which broadens to 10.*, which broadens to * (Note that, unless otherwise indicated, an asterisk (*) as used herein indicates a wildcard representative of zero or more characters); on the domain name field: akamai.net broadens to *.net, which broadens to *; on the geohash field: 3r0dz broadens to 3r0d, which broadens to 3r0, which broadens to 3r, which broadens to 3, which broadens to *. This results in a lattice that encodes a POSET (partially ordered set). For example, {10.0.0.1, akamai.net, 3r0dz} is narrower than {10.0.0.*, akamai.net, 3r0dz}, which is narrower than {10.0.0.*, *.net, 3r0dz}, which is narrower than {10.0.0.*, *.net, 3r0d}. However, {10.0.0.*, akamai.net, 3r0dz}, {10.0.0.1, *.net, 3r0dz}, and {10.0.0.1, akamai.net, 3r0d} are incomparable with each other, but they have a unique infimum {10.0.0.1, akamai.net, 3r0dz} and unique supremum {10.0.0.*, *.net. 3r0d}.

Figure 7:
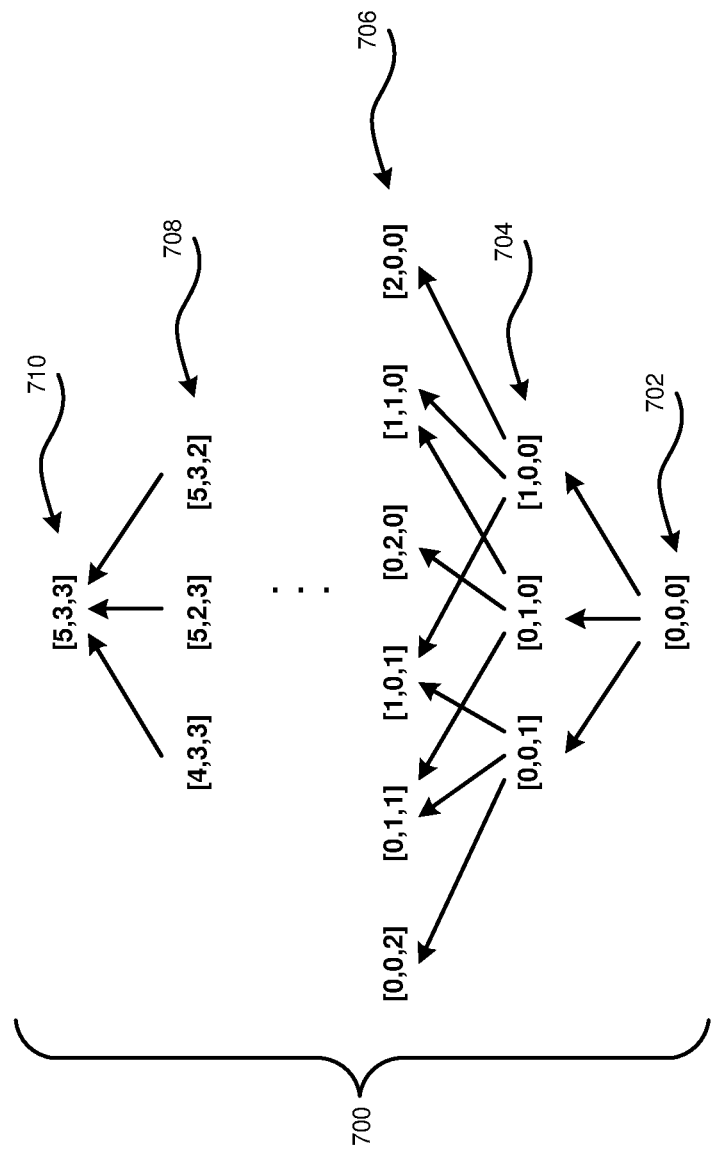
FIG. 7 depicts an example of a lattice in accordance with an illustrative embodiment.

With reference to FIG. 7, this figure depicts an example of a lattice 700 in accordance with an illustrative embodiment. In a particular embodiment, the lattice 700 is an example of a lattice used by the lattice clustering module 600 for lattice clustering as described herein.

In the illustrated embodiment, the lattice 700 has three dimensions. Using the example shown in Table 1, the three dimensions would be [host, domain, geohash], with six levels for the host hierarchy, four levels for the domain hierarchy, and four levels for the geohash hierarchy. The values represent an encoding value indicative of a level of generalization. The lattice 700 includes a plurality of levels, including a lowest level 702 and a highest level 710, bounding a plurality of intermediate levels, including level 704, level 706, and level 708. At the lowest level, [0,0,0] represents a lack of generalization, with each component of the monitored application deployment being uniquely identified.

At the second level 704, any one of the three dimensions is generalized by one level. Continuing with the example from Table 1, [0,0,1] represents the host and domain still being uniquely identified with the geohash value being generalized by one level (e.g., geohash values 3r0d0 through 3r0dz are broadened to 3r0d*, 4e3d0 through 4e3dz are broadened to 4e3d*, etc.). Similarly, [0,1,0] represents the host and geohash still being uniquely identified with the domain value being generalized by one level (e.g., domain value akamai.net is broadened to *.net) and [1,0,0] represents the domain and geohash still being uniquely identified with the host value being generalized by one level (e.g., 10.0.0.1 and 10.0.0.2 broadened to 10.0.0.*). domain value akamai.net is broadened to *.net) [1,0,0) 3r0d0 through 3r0dz are broadened to 3r0d*, 4e3d0 through 4e3dz are broadened to 4e3d*, etc.).

The lattice 700 then shows that from the second level 704 to the third level 706, there are three options for broadening each of the three vectors. For example, from [0,0,1], either the geohash can be generalized by another level [0,0,2] (e.g., geohash values 3r000 through 3r0zz are broadened to 3r0*, etc.) while keeping the host and domain uniquely identified, or the domain can be generalized by one level while keeping the geohash generalized by one level and the host uniquely identified [0,1,1], or the host can be generalized by one level while keeping the geohash generalized by one level and the domain uniquely identified [1,0,1]. This structure continues until ultimately all three dimensions have been maximally generalized at their respective maximum values of [5,3,3] to {*,*,*} at the top level 710.

Turning back to FIG. 6, in some embodiments, lattice clustering includes an auto-grouping technique over a lattice such as lattice 700. The lattice optimization module 614 attempts to find dense groups that are lower in the lattice. The data encoding module 612 first encodes composite keys extracted by the composite key extraction module 602 at the lowest lattice node (i.e., at [0,0,0] on level 702 in FIG. 7). The data encoding module 612 can encode the composite keys to any node in the lattice 700 (encoding the data at [0,0,0] is an identity function, encoding the data at [5,3,3] results in a single group with the key {*,*,*}). The goal is to determine an optimal encoding level such that the lattice typically has high entropy (e.g., at level [0,0,0] the keys may be unique and thus the entropy is log(N), where N is the number of records. However, the group sizes may not satisfy the threshold K. At the highest node in the lattice, the entropy is 0.0 (single group) and the group size is at its maximum N. In general, at any node in the lattice, there are groups of size $n\_1, n\_2, \ldots, n\_m$ such that $n\_1+n\_2+ \ldots +n\_m=N$. Such a group has an entropy of $\log(n\_1/N)-\log(n\_2/N)- \ldots -\log(n\_m/N)$. The group is admissible if $n\_i>=k$ for all i.

The lattice optimization module 614 accepts as input a collection of observations (each observation has a composite key) and a threshold k from the lattice parameters 610. The lattice optimization module 614 traverses the lattice (using bottom-up breadth-first-search strategy; alternative embodiments use other strategies for lattice exploration including top-down and depth-first-search) with the goal of detecting lattice nodes that satisfy the threshold count while maximizing the entropy. Lattice traversal also supports dynamic addition of hints in the form of infimums and supremums that can be used to prune the lattice. Note that if lattice node $l\_1<l\_2$ then entropy $(l\_1)>=$ entropy $(l\_2)$. For example, suppose that l* is currently the best-known lattice node that meets the threshold k. In this case, all lattice nodes that are greater than l* can be pruned from the lattice (as they are guaranteed to have lower entropy than l*). Further if a lattice node l is encountered such that entropy(l)<entropy(l*) then all nodes that are greater than l can be pruned from the lattice.

Figure 8:
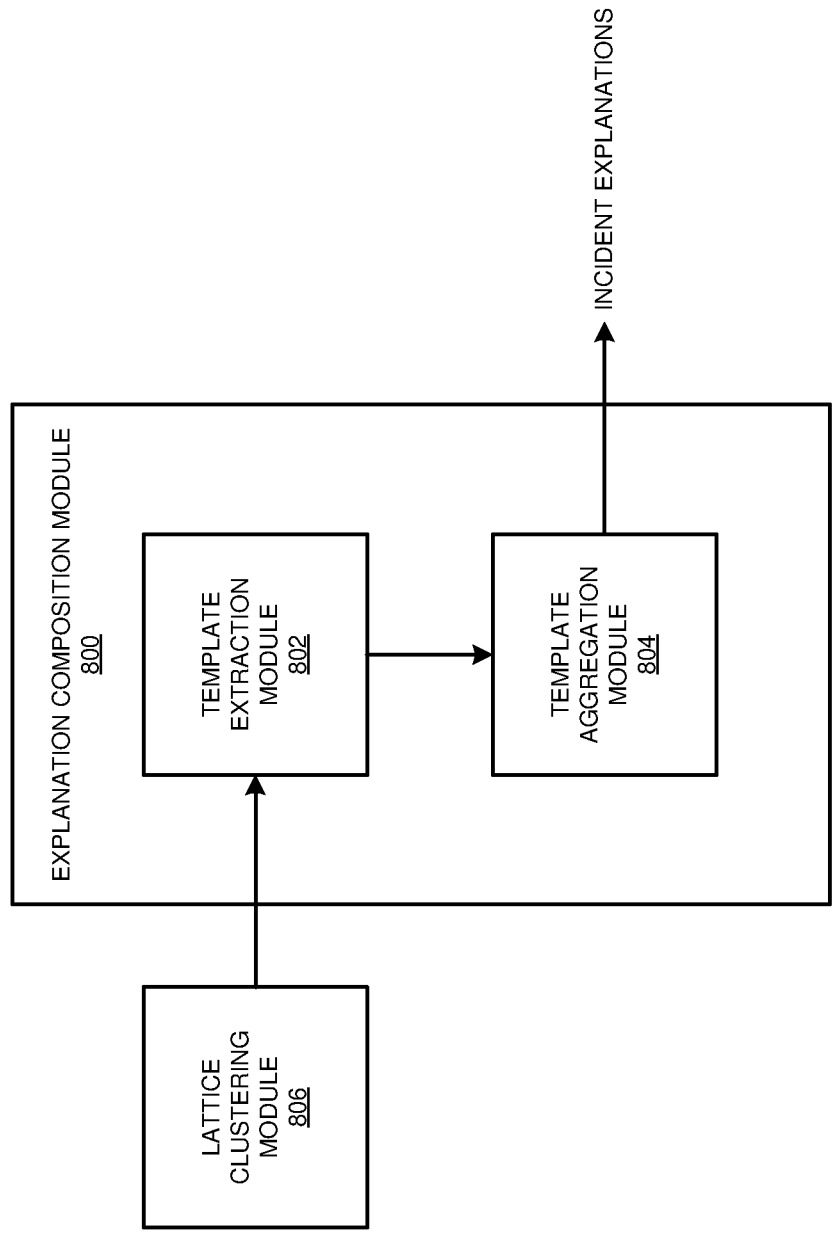
FIG. 8 depicts an example of an explanation composition module in accordance with an illustrative embodiment.

With reference to FIG. 8, this figure depicts a block diagram of an example explanation composition module 800 in accordance with an illustrative embodiment. In a particular embodiment, the explanation composition module 800 is an example of explanation composition module 406 of FIG. 4.

In the illustrated embodiment, the explanation composition module 800 includes a template extraction module 802 and a template aggregation module 804. In alternative embodiments, the persistence detection module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the template extraction module 802 receives log entries associated with clusters of anomalies identified by the lattice clustering module 806. In some embodiments, the lattice clustering module 806 is an example of the lattice clustering module 600 of FIG. 6. In some embodiments, the template extraction module 802 extracts templates from the received log entries. The log entries can be viewed as statements of events that occurred in the systems that generated the log entries. Typically, the log entries include a voluminous set of heterogenous log entries. However, the lattice clustering techniques described herein, such as performed by the lattice clustering module 806, filter the log entries to only those related to a particular significant anomaly. The remaining log entries will still include large volumes of log data that includes many log entries from several components involved or affected by an anomalous event. However, the remaining log entries will include one or more groups of homogenous log entries in which at least a portion of the text is identical. For example, Table 2 below shows an example of a series of log entries related to an anomaly. The log entries include three homogenous groups (entries 1-3, entries 4-6, and entries 7-9). Table 2 shows only nine log entries for the sake of brevity; in actual implementations, the number of log entries related to a significant anomaly may be in the hundreds or thousands and may be interspersed amongst each other rather than grouped as shown in Table 2.

In some embodiments, the template extraction module 802 extracts templates by parsing the log entries to find groups of log entries that are the same or are close to the same and then extracts the text that the groups of log entries have in common. In some embodiments, the template extraction module 802 uses a known log template extraction technique to extract templates from the log entries, such as regular expression based log template extraction techniques or machine learning based techniques that use natural language processing algorithms, such as Word2Vec, to vectorize the log messages and then apply hierarchical clustering to generate log templates. An example of log templates resulting from the log entries in Table 2 are shown in Table 3:

TABLE 3

1. An error occurred while trying to submit document*.
2. Failed to index IndexableDocument with id web_crawl *
[status code = 404, error =
Some(Error(index_not_found_exception, no such index, None)).
3. postgresql: Failed to execute SQL query: ERROR: division by zero Thus, by virtue of the lattice clustering and template extraction, hundreds or thousands of heterogenous log entries are reduced to a handful of log templates that describe various aspects of a single significant anomaly. In some embodiments, the template aggregation module 804 then aggregates the log templates extracted from the clustered log entries to generate a statement of an explanation for the anomaly associated with the clustered log entries. The template aggregation module 804 then outputs the aggregated log templates as an anomalous incident explanation.

Figure 9:
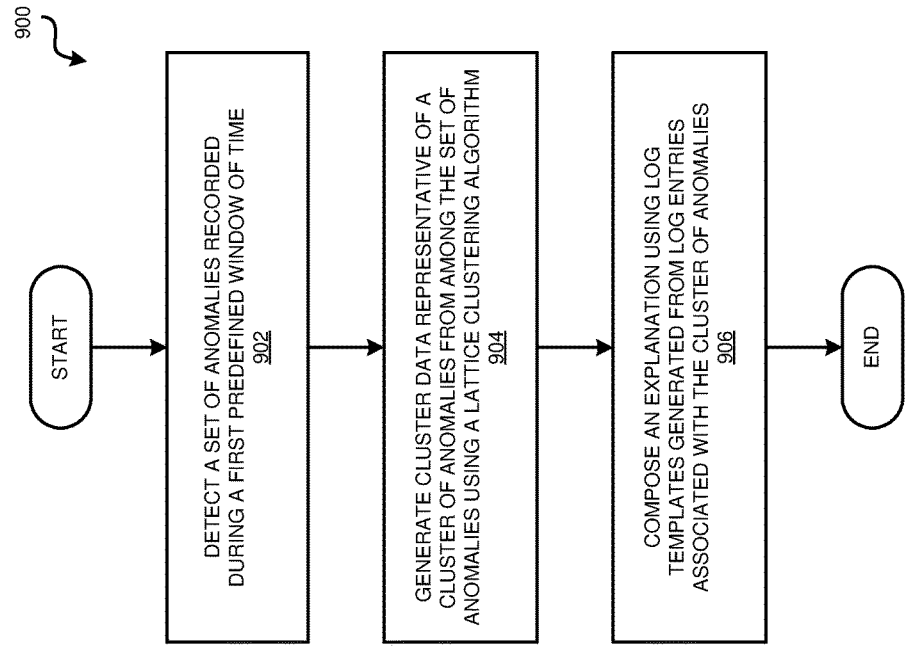
FIG. 9 depicts a flowchart of an example process for generating incident explanations using spatio-temporal log clustering in accordance with an illustrative embodiment.

With reference to FIG. 9, this figure depicts a flowchart of an example process 900 for generating incident explanations using spatio-temporal log clustering in accordance with an illustrative embodiment. In a particular embodiment, the monitoring system 202 or service infrastructure 300 carries out the process 900.

In an embodiment, at block 902, the process detects a set of anomalies recorded during a predefined window of time. In some embodiments, the detected set of anomalies is detected to be a significant set of anomalies by calculating a moving average and a moving standard deviation from binary count data that is indicative of total numbers of anomalies for the predefined window of time. In some embodiments, the predefined window of time is one of a

TABLE 2

1. An error occurred while trying to submit document
d8c4424c13880e67f6d66ebb59c053cc.
2. An error occurred while trying to submit document
d8c4424c13880e67f6d66ebb59c053cc.
3. An error occurred while trying to submit document
d8c4424c13880e67f6d66ebb59c053cc.
4. Failed to index IndexableDocument with id web_crawl 5c948831-fd00-5d3d-8e81-
07b44bc2b323. [status code = 404, error = Some(Error(index_not_found_exception, no
such index, None))
5. Failed to index IndexableDocument with id web_crawl_47ca59b3-87a9-511 2-8c3d-
476911158474. [status code = 404, error = Some(Error(index_not_found_exception, no
such index, None))
6. Failed to index IndexableDocument with id web_crawl 0c51d43d-4ad9-5024-b905-
lfe20087fc8f. [status code = 404, error = Some(Error(index_not_found_exception, no
such index, None))
7. postgresql: Failed to execute SQL query: ERROR: division by zero
8. postgresql: Failed to execute SQL query: ERROR: division by zero
9. postgresql: Failed to execute SQL query: ERROR: division by zero plurality of predefined consecutive windows of time. In some embodiments, the process generates the binary count data from binary data labels for each of one or more monitoring data log entries, where the binary data labels are indicative of the log entry being anomalous or non-anomalous (e.g., "1" indicates anomalous; "0" indicates non-anomalous, or vice-versa). In some embodiments, the process maintains counts of anomalies as indicated by the values of the binary data labels and uses a z-score algorithm to process the anomaly count data in order to detect anomalies of particular significance having a count value that exceeds a threshold number of standard deviations. In some such embodiments, the process uses count values in a moving window of time or number of input data labels to calculate a moving mean and a moving standard deviation. In some embodiments, the process establishes the moving window based on a configurable lag value. In some embodiments, the process uses a configurable influence value (e.g., between 0 and 1) that establishes the impact of new incoming data label values on the mean and standard deviation. For example, a lag of 5 will use the last 5 observations to smooth the data; a threshold of 3.5 will be indicative of a significant anomaly if a count is 3.5 standard deviations away from the moving mean; and an influence of 0.5 gives new data half of the influence that normal data-points have. In some embodiments, the process detects dense anomaly regions by iterating over the significant anomalies in a sliding window fashion and marking windows with total significant anomalies spanning more than a WINDOW_DENSITY parameter (not necessarily contiguous) as dense regions. In some such embodiments, the process allows momentary significant anomalies to be filtered out, allowing the process to focus primarily on anomalies that are significant in number and persist over some threshold period of time as established by the WINDOW_DENSITY parameter. In some embodiments, the process detects persistent anomaly regions by identifying peak widths in the dense anomaly plot along with their start and finish times. If the peak width>WIDTH_THRESHOLD (i.e., the anomaly persists for more than a WIDTH_THRESHOLD parameter), the process marks the anomaly as persistent. If there are several smaller width anomalies close by, the process merges them together and, if the combined width is more than the threshold, then the process labels it as persistent.

Next, at block 904, the process generates cluster data representative of a cluster of anomalies from among the set of anomalies using a lattice clustering algorithm. In some embodiments, the process uses a lattice clustering algorithm that spatially distinguishes the cluster of anomalies based on composite key data associated with the set of anomalies. In some embodiments, the process forms a partially ordered set of data values for an anomaly in the cluster of anomalies using associated composite key data. In some embodiments, the data in the first partially ordered set of data values includes a network address, a subnet address, a domain name, a subdomain name, an Internet protocol address, and/or a geohash. In some embodiments, the process encodes the associated composite key data at a first lattice node using an identify function. In some such embodiments, the process re-encodes the associated composite key data at a second lattice node that is higher than the first lattice node by generalizing at least one of the ordered set of data values. In some embodiments, the process identifies the second lattice node as an optimal encoding level for the first anomaly based at least in part on an entropy value and a count value at the second lattice node.

Next, at block 906, the process composes an explanation using log templates generated from log entries associated with the cluster of anomalies. In some embodiments, the process uses a regular expression based log template extraction technique. In alternative embodiments, the process uses a machine learning based log template extraction technique. In some embodiments, the process aggregates the extracted log templates to generate the explanation.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   detecting a set of anomalies recorded during a first predefined window of time in log entries for a computer environment;
   calculating a moving average and a moving standard deviation from a binary data indicating total numbers of anomalies for respective predefined windows of time, wherein the predefined windows of time are consecutive windows of time and include the first predefined window of time;
   generating cluster data representative of a cluster of anomalies from among the set of anomalies, wherein the cluster is formed using a lattice clustering algorithm that spatially distinguishes the cluster of anomalies from other anomalies in the set of anomalies; and
   composing an explanation using log templates generated from log entries associated with the cluster of anomalies.

2. The computer-implemented method of claim 1, wherein the detecting of the set of anomalies comprises detecting that the total number of anomalies for the first predefined window of time is greater than a sum of the moving average and a threshold number of standard deviations.

3. The computer-implemented method of claim 2, wherein the detecting of the set of anomalies further comprises detecting that the set of anomalies collectively span more than a threshold period of time.

4. The computer-implemented method of claim 2, wherein the detecting of the set of anomalies further comprises detecting that the set of anomalies each individually span more than a threshold period of time.

5. The computer-implemented method of claim 1, wherein the lattice clustering algorithm spatially distinguishes the cluster of anomalies based on composite key data associated with the set of anomalies.

6. The computer-implemented method of claim 5, further comprising forming a first partially ordered set of data values for a first anomaly in the cluster of anomalies using associated composite key data.

7. The computer-implemented method of claim 6, wherein the data in the first partially ordered set of data values is selected from a group consisting of a network address, a subnet address, a domain name, a subdomain name, an Internet protocol address, and a geohash.

8. The computer-implemented method of claim 6, further comprising:
   encoding the associated composite key data at a first lattice node using an identify function.

9. The computer-implemented method of claim 8, further comprising:
   re-encoding the associated composite key data at a second lattice node that is higher than the first lattice node by generalizing at least one of the ordered set of data values.

10. The computer-implemented method of claim 9, further comprising:
    identifying the second lattice node as an optimal encoding level for the first anomaly based at least in part on an entropy value and a count value at the second lattice node.

11. A computer program product comprising one or more computer readable storage media, and program instructions collectively stored on the one or more computer readable storage media, the program instructions executable by a processor to cause the processor to perform operations comprising:
    detecting a set of anomalies recorded during a first predefined window of time in log entries for a computer environment;
    calculating a moving average and a moving standard deviation from a binary data indicating total numbers of anomalies for respective predefined windows of time, wherein the predefined windows of time are consecutive windows of time and include the first predefined window of time;
    generating cluster data representative of a cluster of anomalies from among the set of anomalies, wherein the cluster is formed using a lattice clustering algorithm that spatially distinguishes the cluster of anomalies from other anomalies in the set of anomalies; and
    composing an explanation using log templates generated from log entries associated with the cluster of anomalies.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

14. The computer program product of claim 11, wherein the detecting of the set of anomalies comprises detecting that the total number of anomalies for the first predefined window of time is greater than a sum of the moving average and a threshold number of standard deviations.

15. The computer program product of claim 14, wherein the detecting of the set of anomalies further comprises detecting that the set of anomalies collectively span more than a threshold period of time.

16. A computer system comprising a processor and one or more computer readable storage media, and program instructions collectively stored on the one or more computer readable storage media, the program instructions executable by the processor to cause the processor to perform operations comprising:
- detecting a set of anomalies recorded during a first predefined window of time in log entries for a computer environment;
- calculating a moving average and a moving standard deviation from a binary data indicating total numbers of anomalies for respective predefined windows of time, wherein the predefined windows of time are consecutive windows of time and include the first predefined window of time;
- generating cluster data representative of a cluster of anomalies from among the set of anomalies, wherein the cluster is formed using a lattice clustering algorithm that spatially distinguishes the cluster of anomalies from other anomalies in the set of anomalies; and
- composing an explanation using log templates generated from log entries associated with the cluster of anomalies.

17. The computer system of claim 16, wherein the detecting of the set of anomalies comprises detecting that the total number of anomalies for the first predefined window of time is greater than a sum of the moving average and a threshold number of standard deviations.

\* \* \* \* \*